W. C. PRICKETT.
JIGGING APPARATUS AND PROCESS.
APPLICATION FILED JUNE 11, 1918.

1,315,407.

Patented Sept. 9, 1919.
2 SHEETS—SHEET 1.

Witness

Inventor
W. C. PRICKETT
By
Attorney

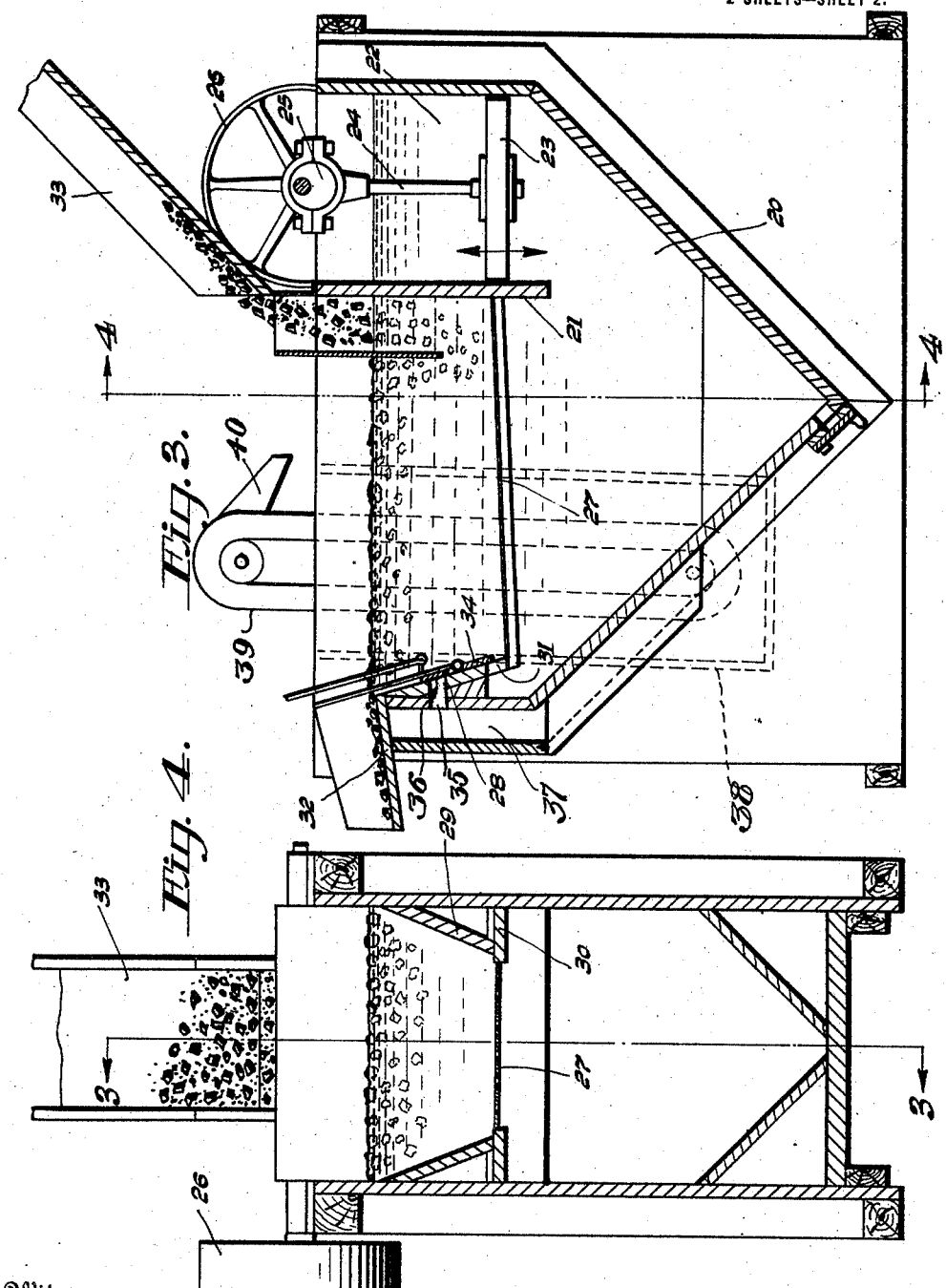

UNITED STATES PATENT OFFICE.

WILLIAM C. PRICKETT, OF BIRMINGHAM, ALABAMA.

JIGGING APPARATUS AND PROCESS.

1,315,407. Specification of Letters Patent. Patented Sept. 9, 1919.

Application filed June 11, 1918. Serial No. 239,357.

*To all whom it may concern:*

Be it known that I, WILLIAM C. PRICKETT, a citizen of the United States of America, residing at Birmingham, in the county of Jefferson and State of Alabama, have invented certain new and useful Improvements in Jigging Apparatus and Processes, of which the following is a specification.

My invention relates to jigging apparatus for coal, ore and other materials which are to be separated and classified according to specific gravity in the presence of water which is caused to pulsate through the bed of material in the jig by the motion of the jig basket itself or by other means which are well understood by those skilled in this art.

The purpose of my invention is to design the jig basket, box or like container which holds the bed of material under treatment so as to give a more perfect separation of the material, it being understood that my invention is applicable to any type of continuous feed and discharge jig.

The jigging apparatus now on the market, regardless of the most careful adjustment and closest attention by the operator, will permit a substantial amount of good material to pass out with the refuse and also some refuse to pass out with the good material. This deficiency is usually slight where the difference in the specific gravity of the materials under treatment is considerable, provided the particles of the materials are fairly uniform in size, but where the difference in specific gravity between the materials under treatment decreases, or where the variety in the sizes of particles increases, this deficiency will be found to rapidly increase.

In seeking to overcome this deficiency I have observed that as the jigs are now made the walls of the basket or bed are substantially vertical so that the area of the bed of material is substantially uniform from top to bottom and that the action of the pulsating water on the particles of material, by vertical relative displacement between water and material, will be the same at the bottom of the bed, where the particles of high specific gravity are collected and discharged, as it is at the top of the bed where the particles of low specific gravity are collected and discharged. Under such conditions, if a particle of material belonging to the product of high specific gravity but which on account of its size or shape, or because of the very slight difference between its specific gravity and the average specific gravity of the product of low specific gravity, tends to pass upward into the stratum of the product of low specific gravity, the force which operates to start such particle away from its proper stratum will act on it with the same intensity at all points in its upward travel with the result that it tends to keep the particle moving upwardly until it reaches the upper stratum where it is held until discharged from the jig. This same principle acts in a reverse manner on the product of low specific gravity when tending to move downwardly into the stratum of high specific gravity, for, if the impulse of the jig is not strong enough to hold such particles in the upper stratum, the impulses will not prevent such particles from passing through the lower stratum and out with the product of low specific gravity. To summarize, these conditions arise primarily from the fact that the impulse of water through the jig basket has a uniform velocity in its passage through the bed of material and this acts with the same force on all particles in the bed. The object of my invention is to produce a varying velocity of flow of the water impulses in its vertical traverse of the bed of material in the jig to the end that the heavier particles in the lower stratum shall be subjected to the highest velocity of and the maximum displacing force exerted by the water impulses while the top stratum is subjected to the lowest velocity of and the minimum displacing force exerted by the water impulses. As a result of this condition, the farther removed a particle is from its proper stratum the greater will be the force (whether of the impulse of water or gravity) acting on it to cause it to pass to its proper stratum. Likewise particles, which, on account of their shape, size, etc., tend to pass out of their proper stratum, will, if moving downwardly, reach a point where the force of the water impulse is sufficient to arrest them, or if moving upwardly, will reach a point where the force of impulse is too weak to move them further. By controlling the discharge of the lower strata and thereby the depths of the same, the operator can, with my invention, maintain an absolute control over the separation of material.

In the application of my process to the jigging of coal I observe that an intermediate stratum of bone coal will be carried between the top stratum and the bottom stratum of slate, this occurring by reason of the fact that the bone coal has a specific gravity intermediate that of the slate and coal and it thus tends to be arrested and remain in suspense in this intermediate stratum. It is desirable and profitable as well as necessary to the best operation of the jig to provide for the withdrawal of this bone coal from the jig and it is an object of my invention to withdraw the bone coal from this intermediate stratum without interference with the normal jigging functions on the stratum of coal and slate.

As illustrative of suitable mechanism for carrying my invention into effect, reference is made to the accompanying drawings, in which:—

Fig. 3 is a sectional view taken on the line 3—3 of Fig. 4, and illustrating my invention applied to another type of jigging apparatus adapted for separating the bone coal as well as the coal from slate.

Fig. 4 is a sectional view taken on the line 4—4 of Fig. 3.

Similar reference numerals refer to similar parts throughout the drawings.

Figure 1:
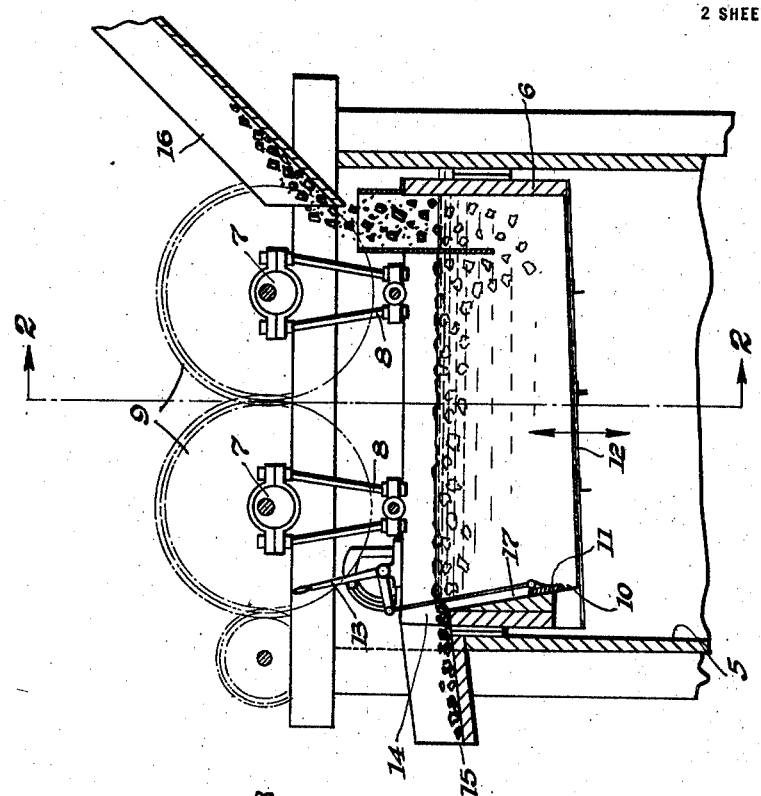
Figure 1 is a sectional view on the line 1—1 of Fig. 2, showing one type of jig equipped with my invention.
Figure 2:
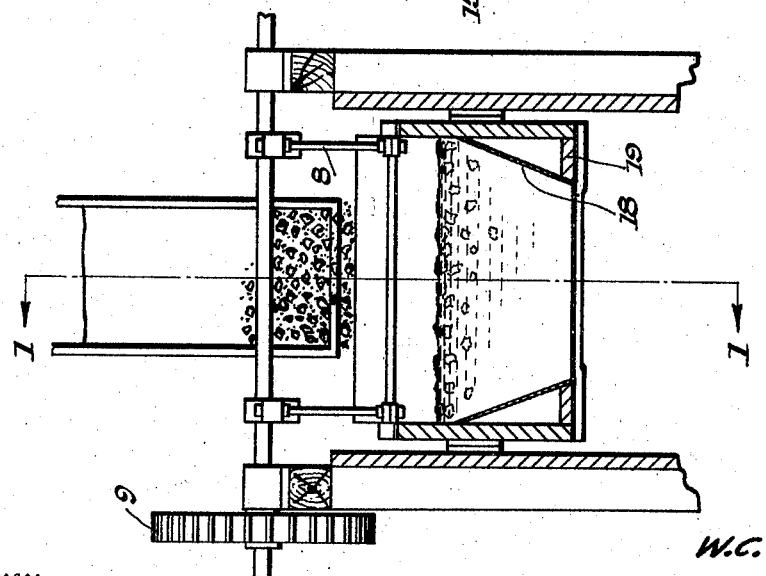
Fig. 2 is a sectional view on the line 2—2 of Fig. 1.

In the embodiment illustrated in Figs. 1 and 2 I show a jig tank 5 having a reciprocatory jig basket 6 vertically movable therein by means of the eccentrics 7 and driving connections 8 therefrom. The eccentrics are mounted on shafts driven in gearing 9 in the manner well understood in this art. The jig basket is provided with a bottom opening 10 for the discharge of slate or particles from the stratum of high specific gravity, the rate of discharge being controlled by an adjustable gate 11 controlled by an adjusting lever 13 mounted on the jig basket. The material under treatment rests on the foraminous or screen bottom 12 of the basket. The coal or material of low specific gravity passes off from the upper stratum through an opening 14 to an overflow trough or chute 15. The material to be treated falls into the jig basket from the chute 16. As thus far described the apparatus is of standard construction. In modifying the jig basket in accordance with my invention, its lower end wall is provided with an upwardly sloping surface 17 extending from the screen bottom 12 substantially to the level of the overflow 14. In like manner the sides of the jig are provided with upwardly and outwardly inclined walls extending from the side edges of the screen 12 substantially to the overflow level of the jig basket. These walls 17 and 18 are substantially inclined so as to produce a material increase in cross-sectional area of the top of the bed as compared with the bottom of the bed of material under treatment in the jig basket. In my preferred arrangement the sloping walls effect an increase of approximately fifty per cent. in the cross-sectional area of the top of the bed over that of the bottom of the bed. Filler strips 19 are connected to the side walls of the jig and extend inwardly to the bases of the inclined walls 18 and are connected to the side edges of the screen 12, but obviously the basket may be constructed in any practicable manner to effect its enlargement upwardly.

Referring to the construction of Figs. 3 and 4, the jig tank 20 is provided with a vertical partition 21 so as to form a plunger chamber 22 in which is mounted to reciprocate a plunger 23 operated by a connecting rod 24 from an eccentric 25 driven by a pulley 26. The lower end of the plunger chamber is open to the tank and a stationary screen 27 is mounted therein in a jig basket or box having an upwardly and outwardly sloping end wall 28 and similarly upwardly and outwardly sloping side walls 29. The screen 27 is mounted in the bottom wall 30 of the basket which has a bottom outlet opening 31 for the material of high specific gravity and a top overflow trough 32 for the material of low specific gravity. The material is fed to this jig by a chute 33 and a gate 34 is provided to regulate the opening 31. In this jigging apparatus the vertical movements of the plunger 23 produce pulsations of water vertically through the bed of the material on the jigging screen 27, and here also the basket is shown with its upper cross-sectional area fifty per cent. larger than the area of the screen 27.

In operation, as the pulsations of water, however produced, travel vertically through the bed of material under treatment in the jig, the water impulses enter the contracted lower end of the basket at highest velocity and, due to the gradually increasing cross-sectional area of the basket, this velocity is slowed down and reaches its minimum at the overflow level of the jig basket. I thus obtain a variant velocity impulse which will exert a gradually decreasing pressure as it travels upwardly through the material on the screen bed, thereby permitting the results more fully pointed out hereinbefore.

Fig. 3 illustrates my invention as adapted for the separation of bone coal from coal and slate and to this end the jig tank is provided with an intermediate bone coal opening 35 controlled by a gate 36 and adapted to discharge bone coal from the stratum which accumulates between the top stratum of coal and the bottom stratum of slate. The bone coal discharged through the opening 35 will fall into a chute 37 having inclined walls to direct it to a tank 38 in which an elevator 39 works to raise and discharge it through a chute 40. By this arrangement I am enabled to obtain a continuous and distinct separation of bone coal and coal from each other and from the slate and the withdrawal of the bone coal from the intermediate stratum does not affect my novel separating process as hereinbefore described.

This invention is not intended to be restricted in scope to the specific embodiment shown, but contemplates such modifications as come within the spirit and scope of the claims.

Whereas I have referred to the use of the intermediate gate as more particularly intended for the separation of bone coal, it is nevertheless to be understood that the same is equally available in any type of jig in connection with the separation of any mineral wherein it is desirable to draw off the intermediate product, i. e., that intermediate between a normal product in the top and bottom stratum.

Having thus described my invention, what I claim as new and desire to secure by Letters Patent, is:—

1. The hereindescribed process of jigging materials to separate them according to their specific gravity, which consists in causing pulsations of water to pass with material variation in its velocity through the bed of material under treatment, and drawing off material from the lower and intermediate strata.

2. The hereindescribed process of jigging materials to separate them according to their specific gravity, which consists in causing pulsations of water to pass with gradually and substantially decreasing velocity as it passes upwardly through the bed of material under treatment to separate it into products of low intermediate and high specific gravity, and withdrawing a controllable proportion of the products of high and intermediate specific gravity.

3. A jigging box having its marginal walls arranged to produce a substantial increase of its cross-sectional area upwardly, and having an intermediate opening for discharging products from its intermediate stratum.

4. A jigging box having upwardly and outwardly sloping walls to give it a gradually and uniformly increasing cross sectional area upwardly, there being a bottom refuse discharge opening, an intermediate discharge opening, and a top overflow discharge opening in a side of said box.

5. A jigging box having its marginal walls arranged to produce a substantial increase of its cross-sectional area upwardly, said box having a slate discharge, an intermediate bone coal discharge opening, and a top coal discharge opening, substantially as described.

In testimony whereof I affix my signature.

WILLIAM C. PRICKETT.

Witness:
NOMIE WELSH.